United States Patent
Sharf et al.

(10) Patent No.: US 9,583,865 B2
(45) Date of Patent: Feb. 28, 2017

(54) PLUGGABLE MODULE FOR A COMMUNICATION SYSTEM

(71) Applicant: Tyco Electronics Corporation, Berwyn, PA (US)

(72) Inventors: Alex Michael Sharf, Harrisburg, PA (US); Alan Weir Bucher, Manheim, PA (US); Nikhil Shankar, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 91 days.

(21) Appl. No.: 14/599,125

(22) Filed: Jan. 16, 2015

(65) Prior Publication Data

US 2016/0211625 A1 Jul. 21, 2016

(51) Int. Cl.
| | |
|---|---|
| H01R 13/648 | (2006.01) |
| H01R 13/506 | (2006.01) |
| H01R 12/72 | (2011.01) |
| H01R 13/6587 | (2011.01) |
| H01R 13/66 | (2006.01) |
| H01R 25/00 | (2006.01) |

(52) U.S. Cl.
CPC ......... *H01R 13/506* (2013.01); *H01R 12/721* (2013.01); *H01R 13/6587* (2013.01); *H01R 13/6658* (2013.01); *H01R 25/003* (2013.01)

(58) Field of Classification Search
CPC .................................................. G02B 6/4261
USPC .................................. 439/76.1, 487; 385/92
See application file for complete search history.

(56) References Cited

U.S. PATENT DOCUMENTS

| | | | | |
|---|---|---|---|---|
| 4,432,038 A | * | 2/1984 | Bell ..................... | H01R 13/516 361/722 |
| 4,710,136 A | * | 12/1987 | Suzuki ................. | H05K 5/0204 165/185 |
| 5,037,313 A | * | 8/1991 | Linden ................. | H05K 7/1448 361/690 |
| 6,179,627 B1 | * | 1/2001 | Daly .................. | H01R 13/6658 439/354 |
| 6,350,063 B1 | * | 2/2002 | Gilliland .............. | G02B 6/4201 385/139 |
| 6,870,746 B2 | * | 3/2005 | Leeson ................ | H05K 9/0058 361/800 |
| 7,074,082 B2 | | 7/2006 | Kerlin et al. | |
| 7,186,134 B2 | * | 3/2007 | Togami .............. | H01R 13/6275 439/160 |
| 7,335,033 B1 | * | 2/2008 | Edwards, Jr. ........ | G02B 6/4246 439/607.01 |

(Continued)

*Primary Examiner* — Neil Abrams (57) ABSTRACT

A pluggable module includes a pluggable body extending lengthwise between a mating end and a cable end. The pluggable body has a first end and an opposite second end with sides extending therebetween along a length of the pluggable body. The first end, second end and sides define a cavity. An internal circuit board is held in the cavity. The internal circuit board is provided at an end of a cable communicatively coupled to the internal circuit board. The pluggable body is configured to be plugged into a receptacle assembly such that the internal circuit board is communicatively coupled to a communication connector of the receptacle assembly. The pluggable body is defined by a first shell including the first end and the sides and may be formed by extrusion and may have increased thermal conductivity and a second shell including the second end.

19 Claims, 4 Drawing Sheets (56) References Cited

U.S. PATENT DOCUMENTS

| | | | | |
|---|---|---|---|---|
| 7,575,380 B2* | 8/2009 | Wang | ............... | G02B 6/4201 |
| | | | | 385/88 |
| 8,002,583 B2* | 8/2011 | van Woensel | ....... | H01R 13/506 |
| | | | | 439/607.27 |
| 8,328,565 B2 | 12/2012 | Westman et al. | | |
| 9,028,155 B2* | 5/2015 | Wang | ............... | G02B 6/4261 |
| | | | | 385/92 |
| 2011/0206328 A1* | 8/2011 | Wang | ............... | G02B 6/4292 |
| | | | | 385/94 |

* cited by examiner

PLUGGABLE MODULE FOR A COMMUNICATION SYSTEM

BACKGROUND OF THE INVENTION

The subject matter described herein relates to a pluggable module for a communication system.

At least some known communication systems include receptacle assemblies, such as input/output (I/O) connector assemblies, that are configured to receive a pluggable module and establish a communicative connection between the pluggable module and an electrical connector of the receptacle assembly. As one example, a known receptacle assembly includes a receptacle housing that is mounted to a circuit board and configured to receive a small form-factor (SFP) pluggable transceiver. The receptacle assembly includes an elongated cavity that extends between an opening of the cavity and an electrical connector that is disposed within the cavity and mounted to the circuit board. The pluggable module is inserted through the opening and advanced toward the electrical connector in the cavity. The pluggable module and the electrical connector have respective electrical contacts that engage one another to establish a communicative connection.

One challenge often encountered in the design of the pluggable module and receptacle assembly is the heat generated during operation of the communication system, which negatively affects module/system reliability and electrical performance. Typically, heat is generated by components on the internal circuit board within the pluggable module and drawn away from the internal circuit board by the metal body of the pluggable module. In some cases, a heat sink that is held by the receptacle assembly housing in direct contact with the metal body of the pluggable module is used to transfer the heat from the pluggable module. Air flowing through and around the receptacle assembly transfers the heat that emanates from the pluggable module. As data throughput speeds of the pluggable modules increase, more heat is generated. Conventional designs are proving to be inadequate for the required heat transfer.

Accordingly, there is a need for a pluggable module for use in a communication system that allows significant heat transfer.

BRIEF DESCRIPTION OF THE INVENTION

In an embodiment, a pluggable module is provided including a pluggable body extending lengthwise between a mating end and a cable end. The pluggable body has a first end and an opposite second end with sides extending therebetween along a length of the pluggable body. The first end, second end and sides define a cavity. An internal circuit board is held in the cavity. The internal circuit board is provided at an end of a cable communicatively coupled to the internal circuit board. The pluggable body is configured to be plugged into a receptacle assembly such that the internal circuit board is communicatively coupled to a communication connector of the receptacle assembly. The pluggable body is defined by a first shell and a second shell. The first shell includes the first end and the sides. The second shell includes the second end.

In another embodiment, a pluggable module is provided including a pluggable body defined by an extruded shell and a die cast shell coupled to the extruded shell. The extruded shell includes a first end extending lengthwise between a mating end and a cable end. The die cast shell includes a second end extending lengthwise between the mating end and the cable end. At least one of the extruded shell and the die cast shell includes sides between the first and second ends. The first end, second end and sides define a cavity. An internal circuit board is held in the cavity. The internal circuit board is provided at an end of a cable communicatively coupled to the internal circuit board. The pluggable body is configured to be plugged into a receptacle assembly such that the internal circuit board is communicatively coupled to a communication connector of the receptacle assembly.

In a further embodiment, a pluggable module is provided including a pluggable body defined by a first shell and a second shell. The first shell includes a first end extending lengthwise between a mating end and a cable end. The second shell includes a second end extending lengthwise between the mating end and the cable end. At least one of the first shell and the second shell include sides between the first and second ends. The first end, second end and sides define a cavity. An internal circuit board is held in the cavity. The internal circuit board is provided at an end of a cable communicatively coupled to the internal circuit board. The pluggable body is configured to be plugged into a receptacle assembly such that the internal circuit board is communicatively coupled to a communication connector of the receptacle assembly. The first shell has a uniform cross-section along the length between the mating end and the cable end. The second shell has a non-uniform cross-section between the mating end and the cable end. The non-uniform cross-section is defined by at least one pocket receiving the electrical component of the internal circuit board.

DETAILED DESCRIPTION OF THE INVENTION

Embodiments set forth herein include communication systems and pluggable modules of the same. The pluggable module provides significant thermal heat dissipation or transfer for the components thereof. Various embodiments of the pluggable module include a pluggable body having a cost effective design. Various embodiments of the pluggable module include a pluggable body that facilitates significant heat transfer.

Unlike conventional pluggable modules that utilize an upper shell and a lower shell both having complex features, embodiments set forth herein have one of the shells made more simply while the other shell is made with the complex design features, such as the features used to hold and align the internal circuit board and other components of the pluggable module. The simple shell may be manufactured from a less expensive manufacturing process, such as extrusion, while the complex shell may be manufactured from another process that allows the complex features to be formed, such as a die casting process. The different shells may be manufactured from different materials.

Unlike conventional pluggable modules that utilize an upper shell and a lower shell both having similar sizes and shapes, including a main, center wall and opposite side walls that extend approximately half way along the sides of the pluggable body meeting at a seam that is approximately centered between the upper and lower main walls, embodiments set forth herein have one of the shells made with all or substantially all of the sides while the other shell is generally only the main or center wall. For example, the upper shell may include the upper wall and both side walls, while the lower shell includes the lower wall extending between the side walls of the upper shell. The seam is thus positioned at the lower end of the pluggable body as opposed to at the approximate center, which is typical of conventional pluggable modules. The increased size of the upper shell makes the upper shell well suited for thermal transfer. The upper shell may be manufactured from a material having good thermal characteristics, such as copper or aluminum material.

Figure 1:
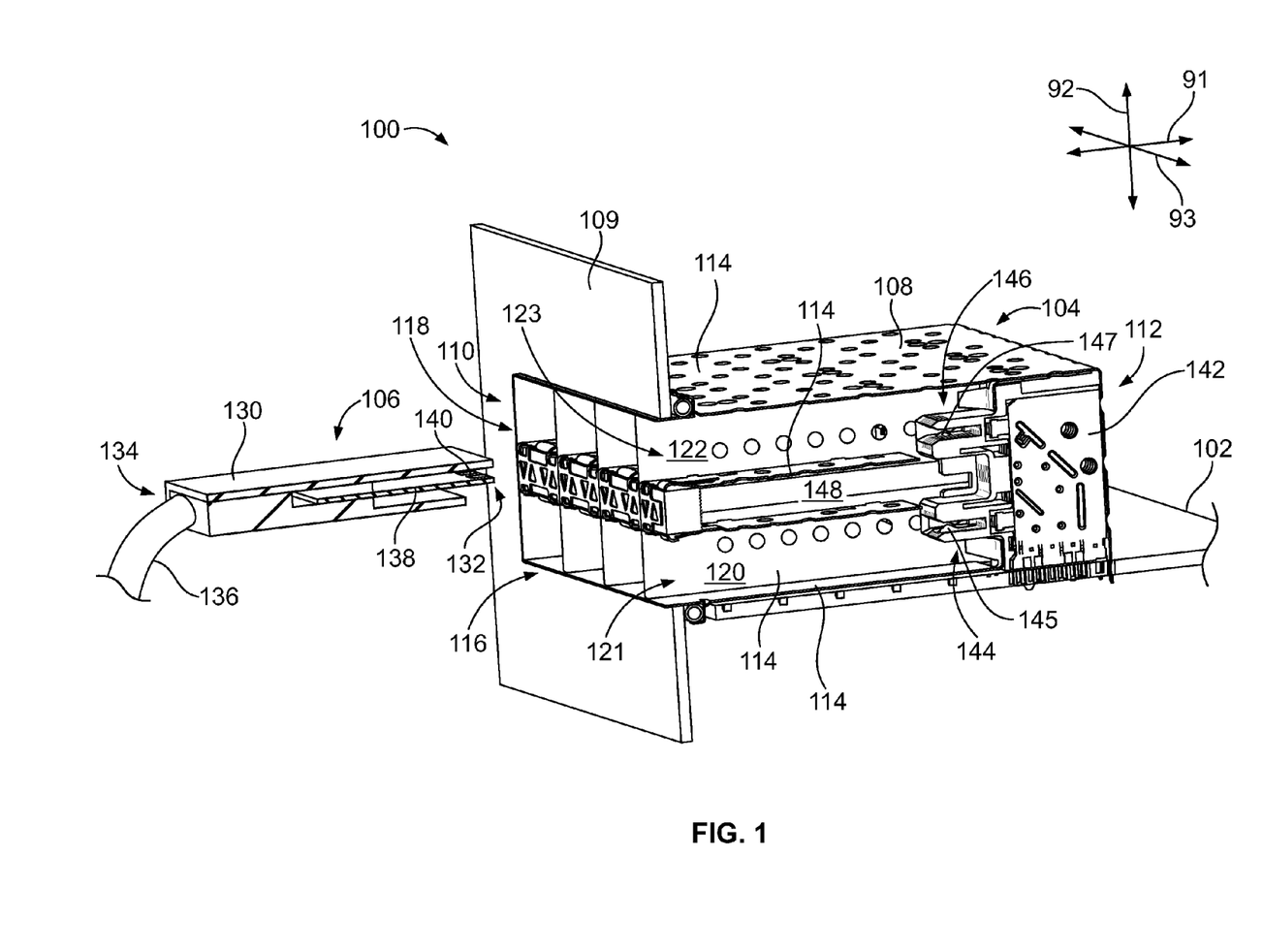
FIG. 1 is a perspective cross-sectional view of a communication system in accordance with an embodiment.

FIG. 1 is a perspective cross-sectional view of a communication system 100 in accordance with an embodiment. The communication system 100 may include a circuit board 102, a receptacle assembly 104 mounted to the circuit board 102, and one or more pluggable modules 106 that are configured to communicatively engage the receptacle assembly 104. The communication system 100 is oriented with respect to a mating or insertion axis 91, an elevation axis 92, and a lateral axis 93. The axes 91-93 are mutually perpendicular. Although the elevation axis 92 appears to extend in a vertical direction parallel to gravity in FIG. 1, it is understood that the axes 91-93 are not required to have any particular orientation with respect to gravity. Moreover, only one pluggable module 106 is shown in FIG. 1, but it is understood that multiple pluggable modules 106 may simultaneously engage the receptacle assembly 104.

The communication system 100 may be part of or used with telecommunication systems or devices. For example, the communication system 100 may be part of or include a switch, router, server, hub, network interface card, or storage system. In the illustrated embodiment, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

The receptacle assembly 104 includes a receptacle housing 108 that is mounted to the circuit board 102. The receptacle housing 108 may also be referred to as a receptacle cage. The receptacle housing 108 may be arranged at a bezel or faceplate 109 of a chassis of the system or device such that the receptacle housing 108 is interior of the device and corresponding faceplate 109 and such that the pluggable module(s) 106 may be loaded into the receptacle housing 108 from outside or exterior of the device and corresponding faceplate 109.

The receptacle housing 108 includes a front end 110 and an opposite back end 112. The front end 110 may be provided at, and extend through an opening in, the faceplate 109. The mating axis 91 may extend between the front and back ends 110, 112. Relative or spatial terms such as "front," "back," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104.

The receptacle housing 108 is configured to contain or block electromagnetic interference (EMI) and guide the pluggable module(s) 106 during a mating operation. To this end, the receptacle housing 108 includes a plurality of housing walls 114 that are interconnected with one another to form the receptacle housing 108. The housing walls 114 may be formed from a conductive material, such as sheet metal and/or a polymer having conductive particles. In the illustrated embodiment, the housing walls 114 are stamped and formed from sheet metal. In some embodiments, the receptacle housing 108 is configured to facilitate airflow through the receptacle housing 108 to transfer heat (or thermal energy) away from the receptacle assembly 104 and pluggable module(s) 106. The air may flow from inside the receptacle housing 108 (for example, behind the faceplate 109) to the external environment (for example, forward of the faceplate 109) or from outside the receptacle housing 108 into the interior of the receptacle housing 108. Fans or other air moving devices may be used to increase airflow through the receptacle housing 108 and over the pluggable module(s) 106.

In the illustrated embodiment, the receptacle housing 108 includes a first (or bottom) row 116 of elongated module cavities 120 and a second (or top) row 118 of elongated module cavities 122. Each of the module cavities 120, 122 extends between the front and back ends 110, 112. The module cavities 120, 122 have respective port openings 121, 123 that are sized and shaped to receive a corresponding pluggable module 106. The module cavities 120, 122 may have the same or similar dimensions and extend lengthwise in a direction that is parallel to the mating axis 91. In the illustrated embodiment, each module cavity 122 is stacked over a corresponding module cavity 120 such that the module cavity 120 is positioned between the module cavity 122 and the circuit board 102. Any number of module cavities may be provided including a single module cavity.

In some embodiments, the pluggable module 106 is an input/output cable assembly having a pluggable body 130. The pluggable body 130 includes a mating end 132 and an opposite cable end 134. A cable 136 is coupled to the pluggable body 130 at the cable end 134. The pluggable body 130 also includes an internal circuit board 138 that is communicatively coupled to electrical wires or optical fibers (not shown) of the cable 136. The cable 136 may be communicatively coupled by directly terminating the wires to the internal circuit board 138, such as by soldering the wires to the internal circuit board. Alternatively, the cable 136 may be communicatively coupled by other processes, such as by using connectors at the end of the cable 136 and on the internal circuit board 138. The internal circuit board 138 is supported by the pluggable body 130. The circuit board 138 includes contact pads 140 at the mating end 132. In FIG. 1, the mating end 132 is configured to be inserted into the module cavity 122 of the receptacle housing 108 and advanced in a mating direction along the mating axis 91. In an exemplary embodiment, the pluggable body 130 provides heat transfer for the internal circuit board 138, such as for the components on the internal circuit board 138. For example, the internal circuit board 138 is in thermal communication with the pluggable body 130 and the pluggable body 130 transfers heat from the internal circuit board 138. In an exemplary embodiment, the heat is transferred from at or near the mating end 132, such as where various electrical components are located on the internal circuit board 138, to the cable end 134. The heat is pulled out of the receptacle assembly 104 and mating end 132 and rejected to the external environment forward of the faceplate 109. In other embodiments, the heat may be drawn into other portions of the pluggable body 130 and/or the heat may be directed to other portions of the pluggable body 130, such as to the mating end 132 where the heat may be transferred to another heat sink or heat transferring component inside the chassis.

The receptacle assembly 104 includes a communication connector 142 having first and second mating interfaces 144, 146. The first mating interface 144 is disposed within the module cavity 120, and the second mating interface 146 is disposed within the module cavity 122. The first and second mating interfaces 144, 146 are aligned with the port openings 121, 123, respectively. Each of the first and second mating interfaces 144, 146 includes respective electrical contacts 145, 147 that are configured to directly engage the contact pads 140 of the pluggable module 106. Thus, a single communication connector 142 may mate with two pluggable modules 106.

In alternative embodiments, the receptacle assembly 104 does not include the stacked module cavities 120, 122 and, instead, includes only a single row of module cavities 120 or only a single module cavity 120. In such embodiments, the communication connector 142 may have a single row of mating interfaces or a single mating interface.

The pluggable module 106 is an input/output (I/O) module configured to be inserted into and removed from the receptacle assembly 104. In some embodiments, the pluggable module 106 is a small form-factor pluggable (SFP) transceiver or quad small form-factor pluggable (QSFP) transceiver. The pluggable module 106 may satisfy certain technical specifications for SFP or QSFP transceivers, such as Small-Form Factor (SFF)-8431. In some embodiments, the pluggable module 106 is configured to transmit data signals up to 2.5 gigabits per second (Gbps), up to 5.0 Gbps, up to 10.0 Gbps, or more. By way of example, the receptacle assembly 104 and the pluggable module 106 may be similar to the receptacle cages and transceivers, respectively, which are part of the SFP+ product family available from TE Connectivity.

Also shown in FIG. 1, the housing walls 114 of the receptacle housing 108 also form a separator plate 148 between the module cavities 120, 122. The separator plate 148 extends generally parallel to the mating axis 91 between the front end 110 and the back end 112. More specifically, the module cavity 120, the separator plate 148, and the module cavity 122 are stacked along the elevation axis 92. Optionally, a light-indicator assembly (not shown), such as a light pipe may be provided in the separator cavity defined by the separator plate 148. The separator cavity may allow airflow between the module cavities 120, 122 to enhance heat transfer from the pluggable modules 106 located in the module cavities 120, 122.

Figure 2:
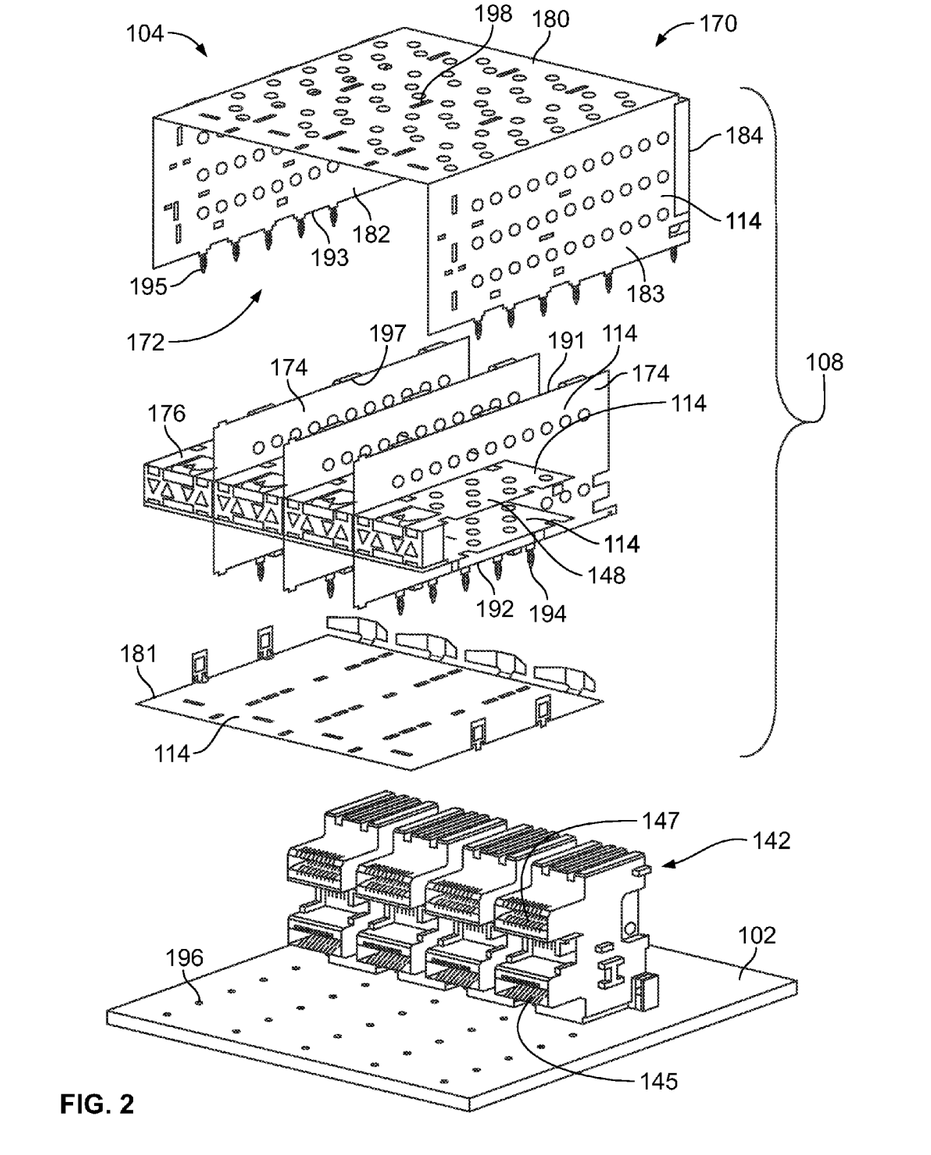
FIG. 2 is a partially exploded view of a receptacle assembly of the communication system shown in FIG. 1.

FIG. 2 is a partially exploded view of the receptacle assembly 104 and illustrates the receptacle housing 108 and a plurality of the communication connectors 142 mounted to the circuit board 102. In some embodiments, the receptacle housing 108 is formed from a plurality of interconnected panels or sheets. For example, the receptacle housing 108 includes a main panel or shell 170 that surrounds a housing cavity 172, a plurality of interior panels 174, a base panel 181, and separator panels 176 defining the separator plate 148. Each of the main panel 170, the interior panels 174, and the separator panels 176 may be stamped and formed from sheet metal. As described in greater detail below, each of the main panel 170, the interior panels 174, and the separator panels 176 may form one or more of the housing walls 114 that define the module cavity 120, the module cavity 122, and the separator plate 148 as shown in FIG. 1. As shown in FIG. 2, the main panel 170 includes an elevated wall 180, sidewalls 182, 183, and a back wall 184. The elevated wall 180 is located furthest from the circuit board 102 when the receptacle assembly 104 is constructed. The base panel 181 may rest on the circuit board 102. The sidewalls 182, 183 and the back wall 184 are configured to extend from the circuit board 102, when mounted thereto, to the elevated wall 180.

The interior panels 174 and the separator panels 176 are configured to be positioned within the housing cavity 172. Within the main panel 170, the interior panels 174 and the separator panels 176 apportion or divide the housing cavity 172 into the separate module cavities 120, 122 (FIG. 1) and the separator cavity of the separator plate 148 (FIG. 1).

In the illustrated embodiment, each of the interior panels 174 has a panel edge 191 that interfaces with the elevated wall 180 and a panel edge 192 that interfaces with the base panel 181 and/or the circuit board 102. The panel edge 192 may include mounting pins or tails 194 that are configured to mechanically engage and electrically couple to vias or thru-holes 196 of the circuit board 102. The panel edge 191 may include tabs or latches 197 that are configured to be inserted through slots 198 of the elevated wall 180 to couple to the elevated wall 180. Likewise, the sidewalls 182, 183 and the back wall 184 may have panel edges 193 that include mounting pins or tails 195 configured to mechanically engage and electrically couple to corresponding vias 196 of the circuit board 102.

The main panel 170, the base panel 181, the interior panels 174, and the separator panels 176 may comprise conductive material, such as metal or plastic. When the receptacle housing 108 is mounted to the circuit board 102, the receptacle housing 108 and the receptacle assembly 104 are electrically coupled to the circuit board 102 and, in particular, to ground planes (not shown) within the circuit board 102 to electrically ground the receptacle housing 108 and the receptacle assembly 104. As such, the receptacle assembly 104 may reduce EMI leakage that may negatively affect electrical performance of the communication system 100 (FIG. 1).

Figure 3:
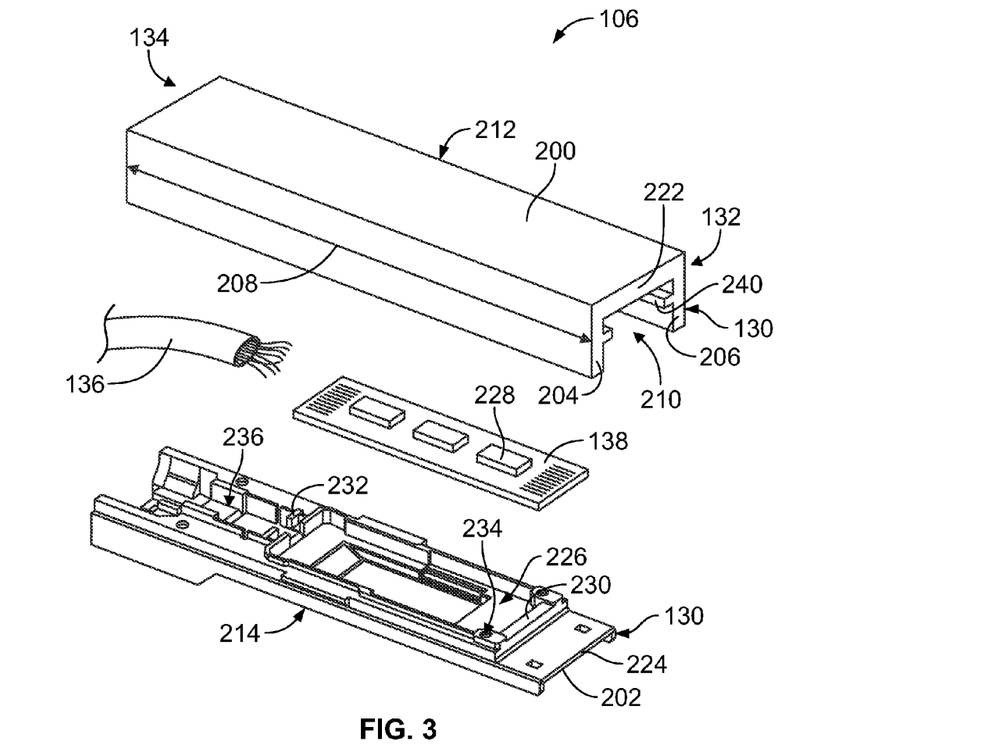
FIG. 3 is an exploded view of a pluggable module of the communication system formed in accordance with an exemplary embodiment.
Figure 4:
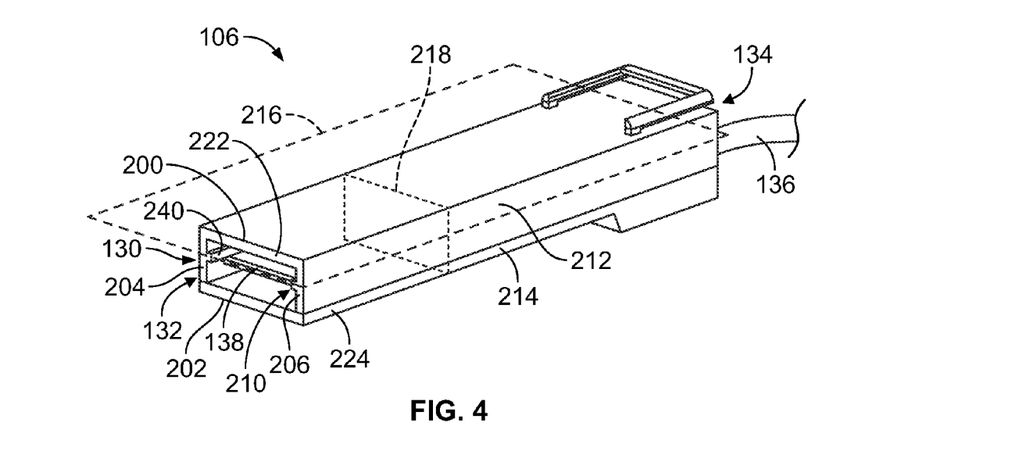
FIG. 4 is a front perspective view of the pluggable module shown in FIG. 3.

FIG. 3 is an exploded view of the pluggable module 106 in accordance with an exemplary embodiment. FIG. 4 is a front perspective view of the pluggable module 106 in accordance with an exemplary embodiment. The pluggable body 130 holds the internal circuit board 138. The pluggable body 130 has a first end 200 and an opposite second end 202 with sides 204, 206 extending between the first and second ends 200, 202. The first and second ends 200, 202 and the sides 204, 206 extend lengthwise along a length 208 of the pluggable body 130 between the mating end 132 and the cable end 134. The first end 200, second end 202 and sides 204, 206 define a cavity 210 that holds the internal circuit board 138.

In an exemplary embodiment, the pluggable body 130 includes a first shell 212 and a second shell 214. Optionally, the first shell 212 may define an upper shell and may be referred to hereinafter as upper shell 212. The second shell 214 may define a lower shell and be referred to hereinafter as lower shell 214. The upper shell 212 includes the first end 200, which defines an upper end or top of the pluggable body 130. The first shell 212 includes the sides 204, 206. Optionally, the first shell 212 may define the entire sides 204, 206. In various embodiments, the upper shell 212 may define a significant majority of the sides 204, 206.

The lower shell 214 includes the second end 202, which may define a lower end or bottom of the pluggable body 130. In various embodiments, the lower shell 214 may define portions of the sides 204, 206, such portions being less than the portions of the sides 204, 206 defined by the upper shell 212. For example, the upper shell 212 may be taller than the lower shell 214 and the lower shell 214 may be shorter than the upper shell 212.

Optionally, the lower shell 214 may be nested in the upper shell 212 such that the second end 202 extends between the sides 204, 206. For example, in such embodiments, the sides 204, 206 of the upper shell 212 may extend to the bottom of the pluggable body 130. In other various embodiments, the lower shell 214 may cap the upper shell 212 such that the second end 202 extends below bottom edges of the sides 204, 206 to close the space between the sides 204, 206. In such embodiments, the second end 202 may define a small portion of the sides 204, 206 at the bottom of the pluggable body 130. FIG. 4 illustrates the lower shell 214 as such. The lower shell 214 is shown extending across the bottom of the first shell 212. The bottom edges of the sides 204, 206 rest on the second end 202 of the lower shell 214. The second end 202 defines portions of the sides 204, 206 of the pluggable body 130; however the significant majority of the sides 204, 206 are formed by the upper shell 212.

As shown in FIG. 4, the cavity 210 has a center plane 216 centered between the first and second ends 200, 202. The sides 204, 206 of the upper shell 212 extend beyond the center plane 216, such as below the center plane 216. As such, the upper shell 212 is provided both above and below the center plane 216. The lower shell 214 is completely positioned on one side of the center plane 216, namely below the center plane 216.

The pluggable body 130, defined by the upper and lower shells 212, 214, defines a perimeter 218 around the cavity 210. In an exemplary embodiment, the upper shell 212 defines at least two-thirds of the perimeter 218. For example, because all or substantially all of the sides 204, 206 are defined by the upper shell 212, the upper shell 212 comprises a majority of the perimeter 218 of the pluggable body 130. Optionally, the sides of the upper shell 212 may comprise at least 90% of the sides 204, 206 of the pluggable body 130. In an alternative embodiment, the lower shell 214 may define the majority of the perimeter 218. For example, in such embodiment, the lower shell 214 may define all or a significant majority of the sides 204, 206 in addition to the second end 202.

In an exemplary embodiment, the upper shell 212 is used for effective heat transfer from the internal circuit board 138. The upper shell 212 is placed in thermal communication with the internal circuit board 138. Heat generated by the internal circuit board 138 is drawn into the upper shell 212 and transferred therefrom. Having the upper shell 212 comprise a majority of the pluggable body 130 allows more heat to be transferred by the upper shell 212 than with conventional pluggable body shells, which are typically approximately half of the pluggable body 130. For example, conventional pluggable body shells typically meet at a seam along the center plane 216 such that both the upper and lower shells form approximately equal portions of the sides 204, 206. Due to manufacturing tolerances and thermal expansion, some gaps may exist along the seam between the shells of conventional pluggable bodies, and these gaps reduce heat transfer from the upper shell to the lower shell. As such, with conventional pluggable bodies, only approximately half the pluggable body (for example, only the upper shell or only the lower shell) is used for heat transfer. In contrast, with the pluggable body 130, having the upper shell 212 define significant portions of the sides 204, 206, which extend near or to the bottom of the pluggable body 130 (for example, significantly beyond the center plane 216), more material and surface area is available for heat transfer. A greater amount of heat transfer is achieved using the enlarged upper shell 212 as compared to conventional shells of conventional pluggable bodies. In alternative embodiments, the lower shell 214 may be oversized compared to the upper shell 212 and the lower shell 214 may be used to transfer the majority of the heat generated by the pluggable module 106 rather than the upper shell 212.

In an exemplary embodiment, the upper shell 212 is fabricated from a different material than the lower shell 214. For example, the upper shell 212 may be fabricated from a material having a higher thermal conductivity than the material of the lower shell 214. For example, the upper shell 212 may be manufactured from copper or aluminum, whereas the lower shell 214 is manufactured from a cheaper material or a material having different characteristics, such as zinc or another material. Using a material having a high thermal conductivity allows a more efficient transfer of heat from the internal circuit board.

In an exemplary embodiment, the upper shell 212 is manufactured by an extrusion process such that the upper shell 212 includes an extruded body 222. The lower shell 214 may be manufactured from a different process, such as a die casting process, a machining process, a stamp and forming process of a sheet metal body, a layering build-up process, such as 3D printing, or another process. For example, the lower shell 214 may include a die cast body 224. Extruding the upper shell 212 is a less expensive manufacturing process than some other processes, such as machining. Additionally, extrusion is a process that may be used on materials having high thermal conductivity. For example, some other processes, such as die casting, require additives or impurities in some materials, such as aluminum, which lowers the thermal conductivity of such material. Additionally, the porosity of the material from die casting may be higher, leading to a lower thermal conductivity of the material. As such, shells made by such die casting may be less effective at heat transfer than shells made from extrusion. The extrusion process creates a simple structure having generally flat walls or surfaces. The upper shell 212 has a substantially uniform cross-section along the length 208. For example, the upper shell 212 may have a uniform cross-section along a majority of the length 208. The substantially uniform cross-section may be made substantially uniform by an extrusion process where the body is pushed or drawn through a die having the desired cross-section. The extrusion process may define an extruded envelope for the extruded body 222 (for example, a shape) and the final upper shell 212 may be contained within the extruded envelope; however some grooves or slots may be formed in the extruded body 222, such as for latching or securing to the lower shell 214, while still defining the substantially uniform cross-section. Optionally, the extruded body 222 may have a uniform cross-section except for one or more grooves or slots formed therein used for securing the upper shell 212 to the lower shell 214. While the upper shell 212 is extruded in the illustrated embodiment, the upper shell 212 may be manufactured by other processes in alternative embodiments, including a die casting process, a machining process, a stamp and forming process of a sheet metal body, a layering build-up process, such as 3D printing, or another process.

In contrast, the machining process or the die casting process allows more complex structures to be formed by having various features cast or formed into the lower shell 214. For example, the die cast body 224 may have supporting features, alignment features, guide features and/or connection features for the internal circuit board 138 and/or for coupling the upper shell 212 to the lower shell 214. For example, the die cast body 224 may include one or more pockets 226 that receive various electrical components 228 of the internal circuit board 138. The die cast body 224 may include supporting elements 230 for supporting the internal circuit board 138. The die cast body 224 may include alignment elements 232 for aligning the internal circuit board 138 within the cavity 210 and/or for aligning the upper shell 212 with the lower shell 214 for connection thereto. The die east body 224 may include securing features 234 used for securing the upper shell 212 to the lower shell 214. For example, the securing features 234 may include threaded bores that receive threaded fasteners to secure the upper shell 212 to the lower shell 214. Other types of securing features 234 may be provided in alternative embodiments, such as latches, clips, and the like for securing the upper shell 212 to the lower shell 214. The die cast body 224 may include a cable support 236 for supporting and/or aligning the cable 136 with the die cast body 224.

The die cast body 224 may be manufactured from any type of material that may be readily die cast. For example, the die cast body 224 may be manufactured from zinc, which is an easy metal to cast as zinc has high ductility, high impact strength and lower costs than some other metals. By providing all the internal cavity complexity of the pluggable body 130 into the lower shell 214, the upper shell 212 can be manufactured more simply, by a process where the upper shell may be made with a predominantly uniform cross-section to reduce the cost and complexity of the upper shell 212.

In the illustrated embodiment, the upper shell 212 includes support ribs 240 extending into the cavity 210 from the sides 204, 206. The support ribs 240 are used to capture the internal circuit board 138 between the lower shell 214 and the support ribs 240. The support ribs 240 may be extruded with the extruded body 222.

Figure 5:
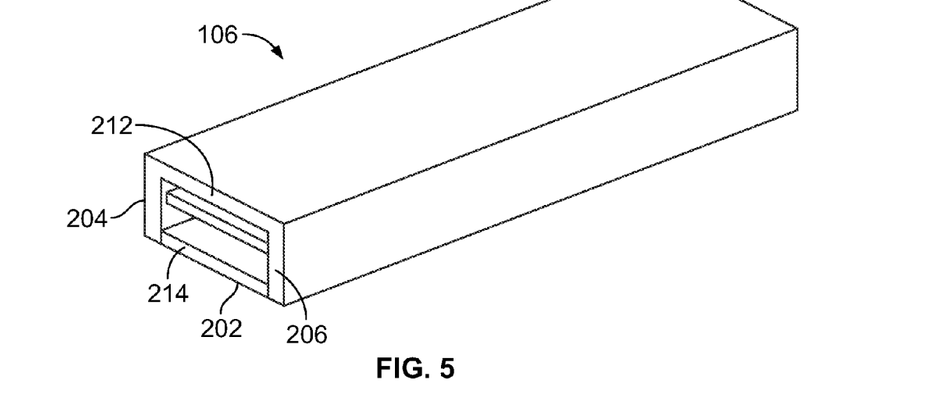
FIG. 5 is a front perspective view of the pluggable module in accordance with an exemplary embodiment.

FIG. 5 is a front perspective view of the pluggable module 106 showing the second shell 214 nested in the first shell 212. The second end 202 extends between the sides 204, 206. In such embodiment, the sides 204, 206 of the upper shell 212 extend to the bottom of the pluggable body 130.

Figure 6:
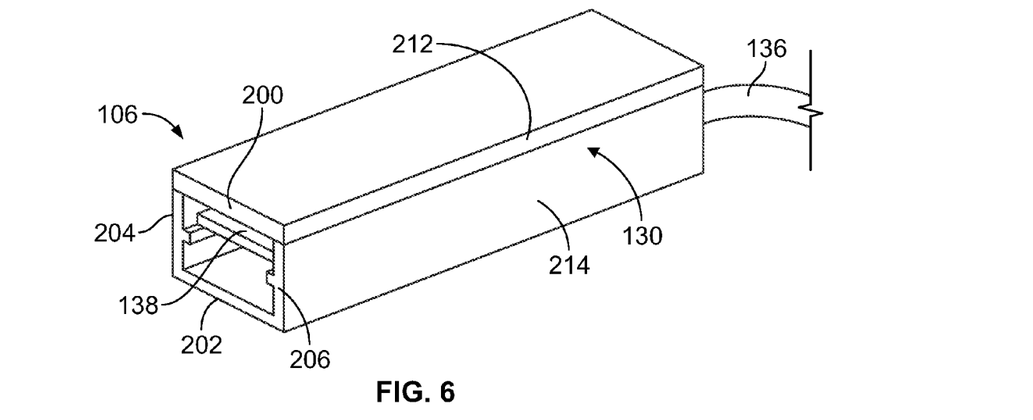
FIG. 6 is a front perspective view of the pluggable module in accordance with an exemplary embodiment.

FIG. 6 is a front perspective view of the pluggable module 106 showing the lower shell 214 comprising the vast majority of the pluggable body 130. For example, the lower shell 214 includes all or substantially all of the sides 204, 206 of the pluggable body 130 in addition to the second end 202. The upper shell 212 includes the first end 200 capping the space between the sides 204, 206 of the lower shell 214. In the illustrated embodiment, the lower shell 214 is used for heat transfer. The lower shell 214 may include an extruded body manufactured from a copper or aluminum material. The upper shell 212 may include a die cast body manufactured from a zinc material. The internal cavity complexity, such as the features for aligning and supporting the cable 136 and internal circuit board 138 may be cast into the upper shell 212, whereas the lower shell 214 may be extruded and have a uniform cross section along the length thereof.

Figure 7:
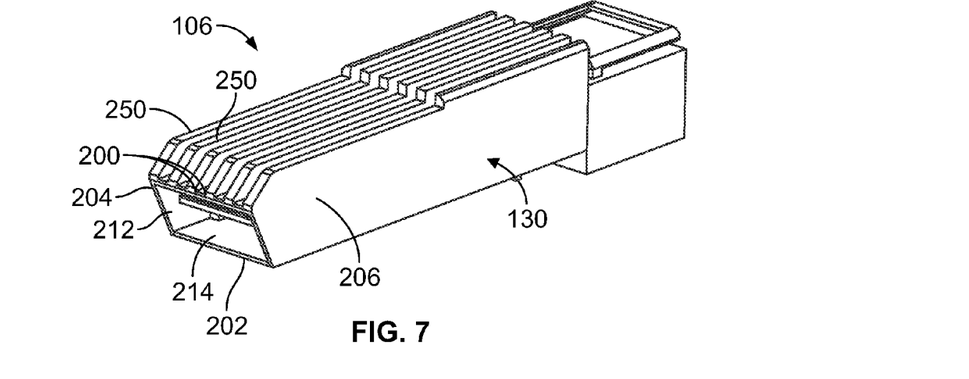
FIG. 7 is a front perspective view of the pluggable module in accordance with an exemplary embodiment.

FIG. 7 is a front perspective view of the pluggable module 106 showing the upper shell 212 including a plurality of fins 250. The fins 250 are used for heat transfer. The fins 250 extend lengthwise along the first end 200; however the fins 250 may extend from the sides 204, 206 and/or the second end 202 in addition to the first end 200 or in lieu of the first end 200. The fins 250 may extend substantially the entire length of the pluggable body 130.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A pluggable module comprising:
a pluggable body extending lengthwise between a mating end and a cable end, the pluggable body having a first end and an opposite second end with sides extending therebetween along a length of the pluggable body, the first end, second end and sides defining a cavity; and
an internal circuit board held in the cavity, the internal circuit board being provided at an end of a cable communicatively coupled to the internal circuit board, wherein the pluggable body is configured to be plugged into a receptacle assembly such that the internal circuit board is communicatively coupled to a communication connector of the receptacle assembly;
wherein the pluggable body is defined by a first shell and a second shell, the first shell comprising the first end and the sides, the second shell comprising the second end, the first shell including an extruded body having a fixed cross-sectional profile from the mating end to the cable end.

2. The pluggable module of claim 1, wherein the second shell is nested in the first shell such that the second end extends between the sides.

3. The pluggable module of claim 1, wherein the second end caps the first shell to close a space between the sides.

4. The pluggable module of claim 1, wherein the sides of the first shell comprise at least 90% of the sides of the pluggable body.

5. The pluggable module of claim 1, wherein the cavity has a center plane centered between the first and second ends, the sides of the first shell extending beyond the center plane such that the first shell is on both sides of the center plane.

6. The pluggable module of claim 5, wherein the second shell is completely positioned on one side of the center plane.

7. The pluggable module of claim 1, wherein the second shell has a non-uniform cross-section from the mating end to the cable end.

8. The pluggable module of claim 1, wherein the first shell defines an upper shell and the second shell defines a lower shell, the internal circuit board captured between the upper shell and the lower shell, the upper shell receiving the internal circuit board such that the upper shell is positioned both above and below the internal circuit board.

9. The pluggable module of claim 1, wherein the first shell and the second shell define a perimeter around the cavity, the first shell defining at least two thirds of the perimeter.

10. The pluggable module of claim 1, wherein the first shell is manufactured from a first material and the second shell is manufactured from a second material different than the first material, the first material having a higher thermal conductivity than the second material, the first shell being in thermal communication with the internal circuit board to transfer heat from the internal circuit board.

11. A pluggable module comprising:
a pluggable body defined by an extruded shell and a die cast shell coupled to the extruded shell, the extruded shell comprising a first end extending lengthwise between a mating end and a cable end, the die cast shell comprising a second end extending lengthwise between the mating end and the cable end, at least one of the extruded shell and the die cast shell comprising sides between the first and second ends, the first end, the second end and the sides defining a cavity; and
an internal circuit board held in the cavity, the internal circuit board being provided at an end of a cable communicatively coupled to the internal circuit board, wherein the pluggable body is configured to be plugged into a receptacle assembly such that the internal circuit board is communicatively coupled to a communication connector of the receptacle assembly.

12. The pluggable module of claim 11, wherein the die cast shell is nested in the extruded shell such that the second end extends between the sides of the extruded shell.

13. The pluggable module of claim 11, wherein the second end caps the extruded shell to close a space between the sides.

14. The pluggable module of claim 11, wherein the sides of the extruded shell comprise at least 90% of the sides of the pluggable body.

15. The pluggable module of claim 11, wherein the extruded shell includes an extruded body having a substantially uniform cross-section from the mating end to the cable end, and wherein the die cast shell includes a die cast body having a non-uniform cross section from the mating end to the cable end.

16. The pluggable module of claim 11, wherein the extruded shell is manufactured from a first material and the die cast shell is manufactured from a second material different than the first material, the first material having a higher thermal conductivity than the second material, the extruded shell being in thermal communication with the internal circuit board to transfer heat from the internal circuit board.

17. A pluggable module comprising:
a pluggable body defined by a first shell and a second shell, the first shell comprising a first end extending lengthwise between a mating end and a cable end, the second shell comprising a second end extending lengthwise between the mating end and the cable end, at least one of the first shell and the second shell comprising sides between the first and second ends, the first end, the second end and the sides defining a cavity; and
an internal circuit board held in the cavity, the internal circuit board being provided at an end of a cable communicatively coupled to the internal circuit board, wherein the pluggable body is configured to be plugged into a receptacle assembly such that the internal circuit board is communicatively coupled to a communication connector of the receptacle assembly;
wherein the first shell includes an extruded body having a substantially uniform cross-section along the length between the mating end and the cable end, the second shell has a non-uniform cross-section between the mating end and the cable end, the non-uniform cross-section being defined by at least one pocket receiving the electrical component of the internal circuit board.

18. The pluggable module of claim 17, wherein the second shell includes a die cast body having the non-uniform cross-section.

19. The pluggable module of claim 17, wherein the first shell is manufactured from a first material and the second shell is manufactured from a second material different than the first material, the first material having a higher thermal conductivity than the second material, the first shell being in thermal communication with the internal circuit board to transfer heat from the internal circuit board.

* * * * *